Nov. 21, 1939.                C. A. MARTIN                2,180,743
MACHINE FOR CUTTING TILE AND THE LIKE
Filed March 21, 1939          2 Sheets-Sheet 2
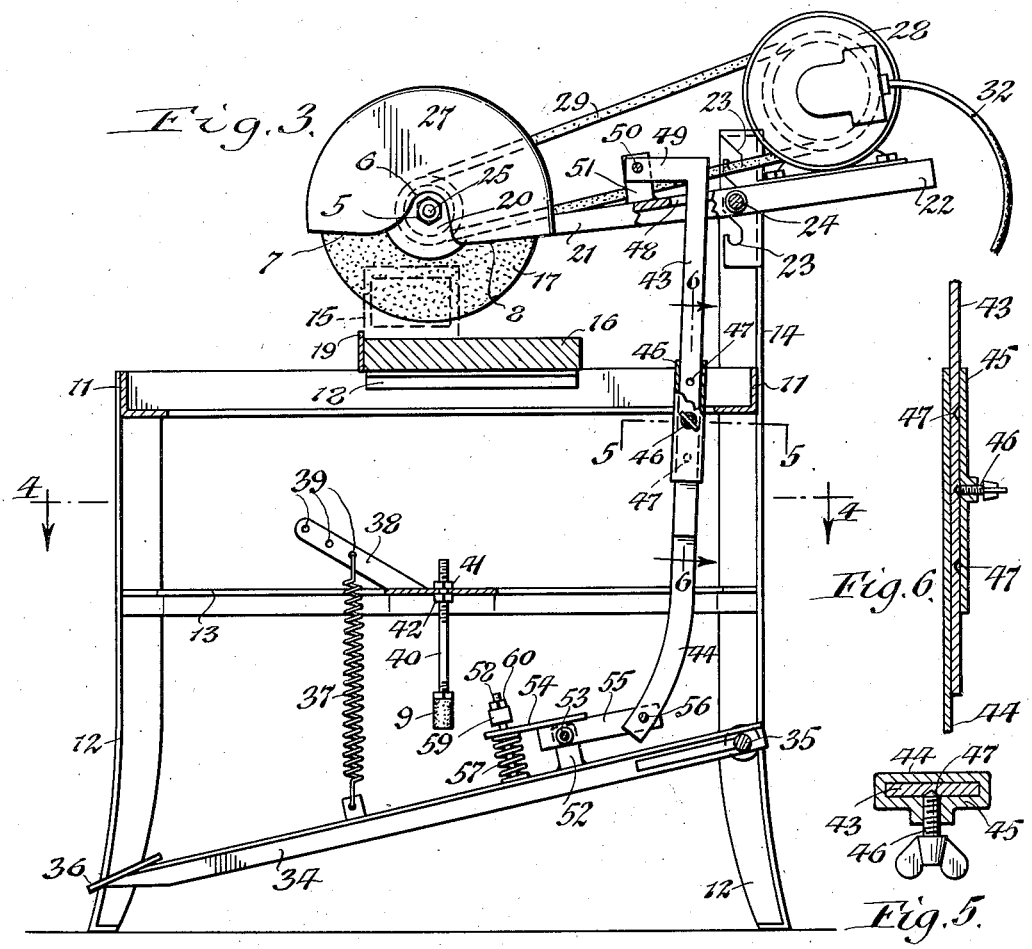
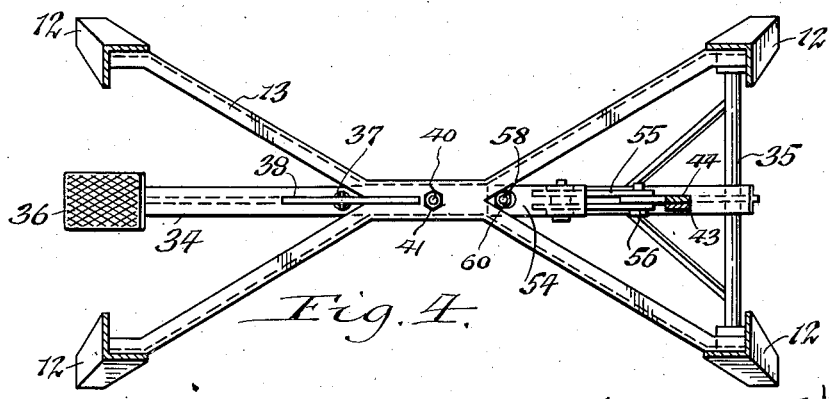
INVENTOR
Charles A. Martin
BY
ATTORNEYS Patented Nov. 21, 1939

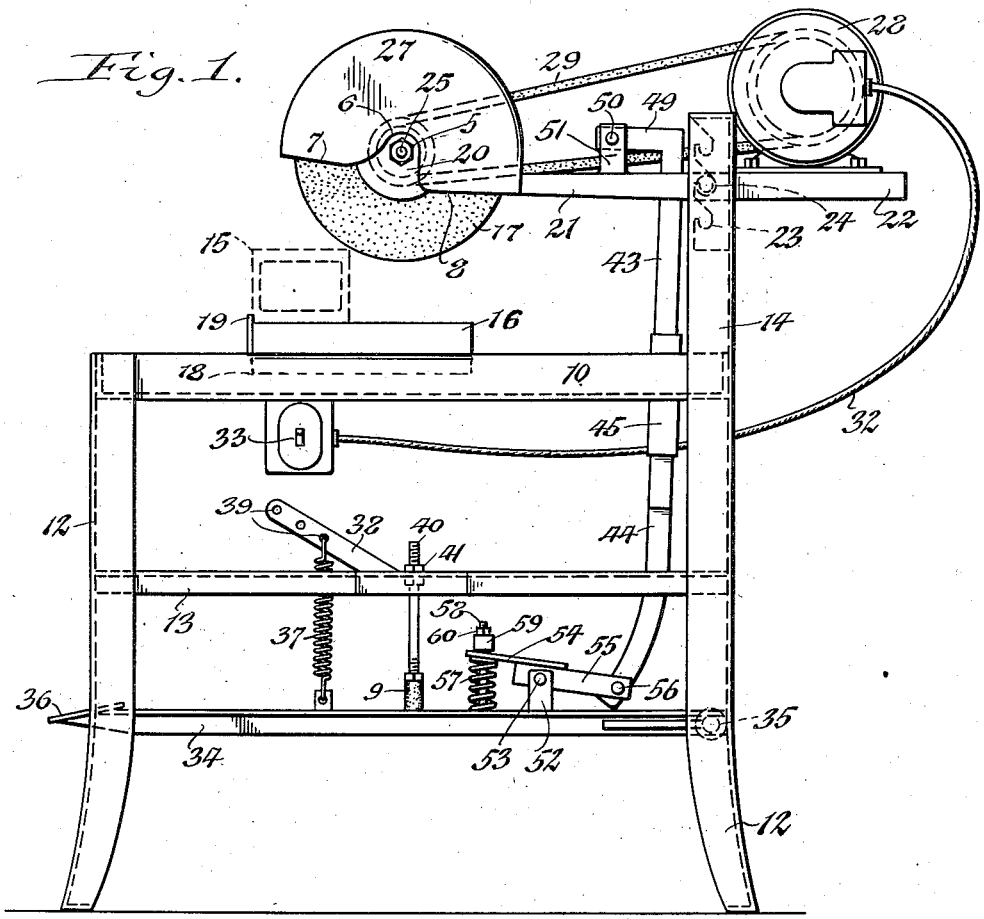
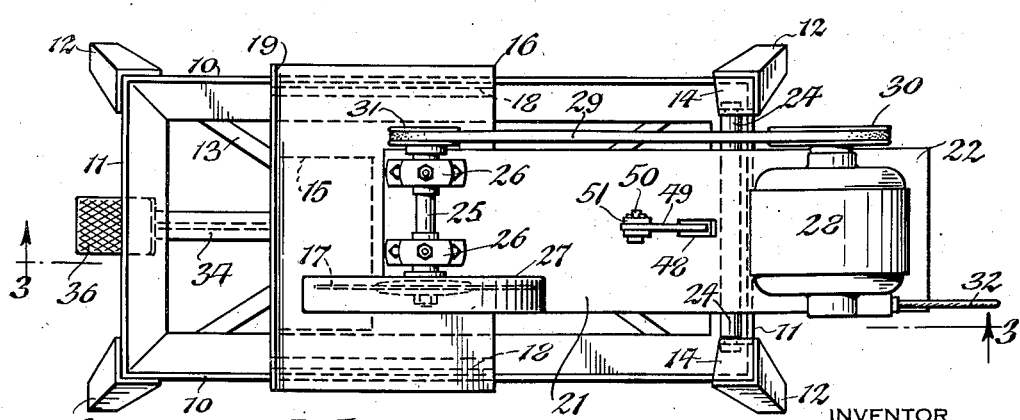

2,180,743

UNITED STATES PATENT OFFICE 2,180,743

MACHINE FOR CUTTING TILE AND THE LIKE

Charles A. Martin, Buffalo, N. Y.

Application March 21, 1939, Serial No. 263,207

3 Claims. (Cl. 125—13)

This invention relates more particularly to a machine for cutting tile in order to fit the same for use in building walls and like structures, although this machine may also be used for cutting or sawing other articles of a similar character.

In machines of this character as heretofore constructed, the bodily movement of the rotary cutter upward and from the article to be cut was effected by mechanism which included a bar subjected to a pushing action for transmitting motion from a foot lever to a rocking beam which carried the rotary cutter. This has been found unsatisfactory inasmuch as the cutter when engaging with a hard spot in the workpiece being cut would rebound and chatter and thus interfere with the cutting operation and render the same imperfect.

These prior machines were also objectionable in that the mechanism for moving the cutter into and out of its working position extended beyond the supporting frame of the machine and thus required an unduly large amount of space for installation.

One of the objects of this invention is to provide improved means for moving the cutter into its operative position with a pulling effect so that chattering and rebounding of the cutter when engaging hard spots in the workpiece are avoided.

Another object of this invention is to so organize the shifting means for moving the cutter into and out of its operative position that these shifting means are arranged wholly within the main frame and thus permit of installing the machine within a minimum amount of space.

A further object of this invention is to so construct the cutter shifting mechanism that no parts of the same extend outside of the main frame and still provide ample clearance for the movement of the carriage upon which the workpiece is moved past the cutter of a machine.

A still further object of this invention is to provide a cushioning device for the cutter shifting mechanism which is simple in construction and efficient in operation and which will permit the cutter to yield when encountering a hard spot during the operation of cutting a tile or like article.

An additional object of this invention is to so mount and guard the rotary cutter of the machine that a greater amount of the same can be used before it is discarded.

In the accompanying drawings:

Fig. 1 is a side elevation of a machine for cutting tile and similar articles embodying this invention and showing the parts in the position in which the cutter is raised and out of engagement from the article to be cut.

Fig. 2 is a top plan view thereof.

Fig. 3 is a vertical longitudinal section taken on line 3—3, Fig. 2 and showing the parts in the position which they occupy when the cutter is depressed and engaged with the article being cut.

Fig. 4 is a horizontal section taken on line 4—4, Fig. 3.

Fig. 5 is a fragmentary horizontal section, on an enlarged scale, taken on line 5—5, Fig. 3.

Fig. 6 is a fragmentary vertical section, on an enlarged scale, taken on line 6—6, Fig. 3.

In the following description similar characters of reference indicate like parts in the several figures of the drawings:

Although the main frame of the machine may be of any suitable construction to support the several working parts, the same preferably comprises a pair of spaced upper longitudinal guide rails 10, 10, front and rear cross bars 11, 11 connecting the front and rear ends, respectively, of said rails, four supporting legs 12 secured at their upper ends to the corners between said rails and cross bars, an X-shaped brace 13 connecting these legs about midway between the upper and lower ends thereof, and two standards 14, 14 projecting upwardly from the rear legs.

The article to be cut, which in the instant case will be assumed to be a building tile or concrete building block, as shown by dotted lines at 15 in Figs. 1, 2 and 3, is supported upon a carriage or table 16 slidable horizontally and lengthwise of the machine on the rails 10 for the purpose of moving this article back and forth past the underside of a rotary cutter blade or saw 17 of the machine. This carriage may slide lengthwise on the rails 10 but is held against lateral movement thereon by any suitable means, for example, by means of guide cleats 18 secured to the underside of this carriage and engaging with the inner side of said rails.

For the purpose of maintaining the workpiece in a definite position on the carriage while the same is being cut, a shoulder or stop 19 is provided on the front edge of the carriage and adapted to be engaged by the front side of the workpiece as the latter rests upon the carriage so that upon moving the latter forwardly the workpiece will be carried in the same direction and held reliably in place while being moved past the cutter.

The rotary cutter 17 may be of any suitable construction and material which is best adapted for the particular work in hand but for the purpose of cutting tile and similar articles or workpieces, this cutter has its body preferably constructed in the form of a relatively thin disk made of a suitable abrasive material and provided with a hub 20 which is mounted for rotation about an axis arranged horizontally and transversely relative to the direction of movement of the carriage 16 on the main frame. In the operation of this machine the rotary cutter is bodily oscillated vertically and is depressed when in its operative position so that it will be engaged by the workpiece as the latter is moved forwardly, and elevated after the cutting operation has been completed so as to permit of retracting the workpiece forwardly without interference with the cutter.

The means for thus movably mounting the cutter includes a longitudinal supporting beam or lever which is pivotally mounted between its front and rear arms 21 and 22 on the standards of the main frame so as to rotate about a horizontal transverse axis, this pivotal mounting being capable of vertical adjustment for the purpose of adapting the cutter blade to the dimensions of the workpiece which is being cut and also to compensate for any reduction in the diameter of the cutter as the same becomes worn by use.

This vertical adjustment of the pivotal mounting of the rocking beam may be effected by various means, but as shown in the drawings, the same preferably is effected by means which consist of two vertical rows of upwardly opening hook-shaped bearing sockets 23 arranged on the opposing inner sides of the standards 14, and trunnions 24 projecting laterally from opposite sides of the beam between the arms thereof and seated in a corresponding pair of the bearing sockets 23 in the standards so as to turn therein. Upon engaging the trunnions 24 with a higher or lower pair of companion bearing sockets 23 the axis of this beam may be raised or lowered to suit the position which is required by the size of the workpiece and the diameter of the rotary cutter. The rotary cutter projects with its lower part below the underside of the front arm 21 of the rocking beam and its hub 20 is secured by a nut 5 to the front end of a cutter shaft 25 which is journaled transversely and horizontally in bearings 26 mounted on the upper side of the front beam arm 21. For the purpose of protecting the operator against injury, the upper part of the cutter 17 is covered by a safety guard or hood 27 which is mounted on the adjacent part of the front beam arm 21.

In order to permit of conveniently applying the nut 5 to the front end of the cutter shaft for securing the hub of the cutter thereto and also removing the same therefrom, the outer side wall of the cutter hood or cover 27 is provided with a clearance notch 6. To permit the cutter to descend as far as possible and enable its peripheral edge to be worn the maximum extent the lower edge portions 7 and 8 of each of the side walls of the cover 27 on opposite sides of the axis of the cutter diverge upwardly and the front part 7 of this edge is inclined upwardly relative to the rocking beam, as shown in Figs. 1 and 3, thereby avoiding engagement of the protecting cover with the workpiece in the lowermost position of the cutter. It is therefore possible to use a greater amount of the cutter before renewal thereof becomes necessary and effect a corresponding saving in cost of maintenance.

Although the power for operating the cutter may be derived from any suitable source or prime mover, it is preferable to employ for this purpose an electric motor 28 which is mounted on the rear beam arm 22 and therefore serves the additional function of counterbalancing the weight of the cutter and associated parts. Motion is transmitted from this motor to the cutter by means of a belt 29 passing around a driving pulley 30 on the driving shaft of the motor and a driven pulley 31 mounted on that end of the cutter shaft 25 opposite to the cutter disk. The electric current for operating the motor 28 is preferably conducted thereto through feed lines which are arranged in a cable 32 leading from a switch 33 to the motor, which switch is mounted on the underside of one of the guide rails 10 where the same is conveniently accessible to the operator for controlling the operation of the apparatus.

A vertically rocking movement is imparted to the beam for carrying the rotary cutter into and out of the path of the workpiece by shifting means which include a vertically swinging treadle or foot lever 34 arranged lengthwise in the lower part of the main frame and pivoted by means of a transverse rod 35 on the lower parts of the rear frame legs. This foot lever is adapted to be depressed by the pressure of a foot against a pedal or footpiece 36 on the front end thereof, and when free this lever is yieldingly held in an elevated position by means of a spring 37 which is connected at its lower end with the foot lever 34 while its upper end is connected with an inclined bracket 38 projecting upwardly and forwardly from the central part of the X-brace 13. The effectiveness of this spring 37 may be increased or decreased by engaging its upper end with one or another of a plurality of adjusting openings 39 arranged in an inclined row on the bracket 38, these openings being arranged at successively greater heights from the rear to the front end of this row. The upward or return movement of the foot lever 34 is arrested by means of a stop 9 preferably constructed of rubber so as to cushion the stopping action. This stop is also adjustably mounted on the main frame so that the upward limit of the movement of the foot lever may be varied to suit different conditions. For this purpose the stop 9 is mounted on the lower end of an upright stop rod 40, which latter passes through an opening in the central part of the brace 13 and is provided above and below the same with clamping nuts 41, 42. By turning these nuts so as to either raise or lower the rod 40 the stop 9 may be shifted vertically for arresting the upward movement of the foot lever 34 as required.

Shifting means are provided for transmitting the vertical movement of the foot lever to the beam which carries the rotary cutter and the motor. These shifting means are arranged wholly within the main frame of the machine so that a minimum amount of space is required for its installation and these shifting means are also so organized that motion is transmitted from the foot lever to the rocking beam with a pulling action whereby a more effective pressure of the cutter against the workpiece is obtained and chattering as well as rebounding of the cutter from the workpiece is avoided when the cutter encounters a hard spot in the workpiece while operating the machine.

Although these shifting means may be varied in detail, the same are preferably organized as follows:

Within the main frame and adjacent to the standards 14 the rear legs 12 and the rear cross bar 11 is arranged an upright shifting bar having an upper section 43 and a lower section 44 which are adjustably connected so that this shifting bar as a whole can be lengthened or shortened. The preferred means for thus varying the length of the shifting bar are best shown in Figs. 3, 5 and 6 and comprise a guide sleeve 45 secured to the upper end of the lower shifting bar section 44 and receiving the lower end of the upper bar section 43, and a clamping screw 46 working in a threaded opening in the sleeve 45 and adapted to engage with one or another of a vertical row of recesses 47 in the side of the upper shifting bar section 43. Upon loosening the screw 46 and sliding the two bar sections 43, 44 lengthwise relatively to each other and then again tightening the screw so as to engage with the appropriate recess 47, the distance between the extremities of these bar sections may be varied to suit requirements.

The upper part of the upper shifting bar section 43 passes through an opening 48 in the front beam arm 21 and at its upper extremity this bar section is provided with a forwardly projecting arm 49 the front end of which is pivotally connected by means of a pin 50 to a lug 51 projecting upwardly from the beam arm 21 in front of the opening 48. By means of this construction the upper section 43 of the shifting bar is arranged sufficiently far back to avoid interference with the workpiece on the supporting carriage 16 when the latter is in the rearmost position, and the pivotal connection 50 between this shifting bar section and the front beam arm is arranged a sufficient distance in front of the axis or trunnions 24 of the beam so that a good leverage is obtained for moving the cutter into and out of its operative position with ease and with a minimum expenditure of effort on the part of the operator.

The lower section 44 of the shifting bar is connected with the foot lever 34 by cushioning means which permit the cutter to yieldingly engage the workpiece upon depressing the foot lever and thereby avoid undue strain on the parts as well as improving the quality of the work.

These cushioning means include a cushioning lever which is arranged above the foot lever 34 and is pivoted to an upwardly projecting lug 52 on the latter by means of a horizontal transverse pivot pin 53 passing through this cushioning lever between its front and rear arms 54, 55, a pin 56 pivotally connecting the rear cushioning arm 55 with the lower end of the lower section 44 of the shifting bar, a spring 57 interposed between the front cushioning arm 54 and the adjacent part of the foot lever 34 and a stop rod 58 passing through the spring 57 and the front cushioning arm 54 and connected at its lower end with the foot lever 34 while its upper end is provided with a stop 59 adapted to be engaged by the front cushion arm 54 for limiting the upward movement of this arm under the lifting effect of the spring 57. This stop preferably consists of a block of rubber or similar resilient material and its position on the stop rod 58 may be adjusted by means of an adjustable screw nut 60 arranged on this rod and engaging with the upper side of the stop block 59, as best shown in Figs. 1 and 3.

When the machine is idle the foot lever is raised into its highest position by means of the spring 37, and the front arm of the rocking beam is also raised so that the cutter is in its uppermost position, as shown in Fig. 1. Upon depressing the foot lever 34 this movement is transmitted to the rocking beam by means of the shifting mechanism which connects the same, whereby the cutter 17 is depressed into its operative position and severs the tile or other workpiece which may be moved rearwardly past the same, as shown in Fig. 2. If, during the downward movement of the foot lever, only sufficient pressure is applied to lower the cutter, the front arm 54 of this cushioning lever will remain in engagement with the stop 9. If, however, the downward movement of the foot lever is resisted by engagement of the cutter with the workpiece the cushioning means interposed between the foot lever and the lower section of the shifting bar will yield and permit the foot lever to momentarily move downwardly independently of the rocking beam but the resilience of the spring 57 will cause the cutter to follow up the depression of the foot lever until the latter engages with the stop 59.

During such action the downward movement of the pivot 53 of the cushioning lever independently of the pivotal connection 56 between this lever and the lower shifting bar section 44 will cause the front arm 54 of the cushioning lever to descend and approach the foot lever 34, thereby compressing the spring 57 and producing a yielding pressure of the cutter 17 against the workpiece. The instant that the resistance of the cutter ceases, such as would occur when the cutting operation had been completed, the spring 57 again raises the front cushioning arm 54 and restores the parts to their normal position so that when the foot lever 34 is subsequently raised by means of the spring 37 the rocking beam will also be turned reversely and the cutter will be raised relative to the workpiece on the carriage 16 preparatory to moving the latter forward when beginning the next cutting operation.

The means whereby this effect is obtained are simple in construction, capable of being reduced at low cost, and they are also not liable to get out of order so that the upkeep of the apparatus is negligible.

I claim as my invention:

1. A machine for cutting tile and the like comprising a frame, a carriage slidable on said frame and adapted to support the article to be cut, a rotary cutter for cutting said article movable toward and from the carrier, a vertically swinging beam pivoted on the upper part of the frame and having a front arm which carries said cutter and a rear arm, a motor mounted on said rear arm and operatively connected with said cutter for driving the latter, and means for rocking said beam including a foot lever pivoted at its rear end on the lower part of said frame, and a shifting device operatively connecting said foot lever and the front arm of said beam whereby a depression of said lever will pull down the front arm of said beam and the cutter mounted thereon, said shifting device including an upright bar pivotally connected at its upper end with the front arm of said beam, an intermediate cushioning lever pivoted on said foot lever and having a rear arm pivoted to the lower end of said bar and also having a front pressure arm, and a compressible spring interposed between the underside of said pressure arm and said foot lever.

2. A machine for cutting tile and the like comprising a frame, a carriage slidable on said frame and adapted to support the article to be cut, a rotary cutter for cutting said article movable toward and from the carrier, a vertically swinging beam pivoted on the upper part of the frame and having a front arm which carries said cutter and a rear arm, a motor mounted on said rear arm and operatively connected with said cutter for driving the latter, and means for rocking said beam including a foot lever pivoted at its rear end on the lower part of said frame, and a shifting device operatively connecting said foot lever and the front arm of said beam whereby a depression of said lever will pull down the front arm of said beam and the cutter mounted thereon, said shifting device including an upright bar pivotally connected at its upper end with the front arm of said beam, an intermediate cushioning lever pivoted on said foot lever and having a rear arm pivoted to the lower end of said bar and also having a front pressure arm, a compressible spring interposed between the underside of said pressure arm and said foot lever, and means for limiting the upward movement of said pressure arm relative to said foot lever consisting of a stop rod passing through said spring and pressure arm and connected at its lower end with said foot lever, and a stop arranged on the upper part of said stop rod and adapted to be engaged by the upper side of said pressure arm.

3. A machine for cutting tile and the like comprising a frame, a carriage slidable on said frame and adapted to support the article to be cut, a rotary cutter for cutting said article movable toward and from the carrier, a vertically swinging beam pivoted on the upper part of the frame and having a front arm which carries said cutter and a rear arm, a motor mounted on said rear arm and operatively connected with said cutter for driving the latter, and means for rocking said beam including a foot lever pivoted at its rear end on the lower part of said frame, a shifting device operatively connecting said foot lever and beam, and adjustable means for yieldingly holding said foot lever in an elevated position consisting of a bracket mounted on said frame and provided with an inclined row of holes, and a spring connected at one end with said foot lever and adapted to be engaged at its opposite end with one of the holes in said bracket.

CHARLES A. MARTIN.